J. REECE.
VARIABLE SPEED TRANSMITTER.
APPLICATION FILED AUG. 12, 1915.
1,198,662.
Patented Sept. 19, 1916.
6 SHEETS—SHEET 1.
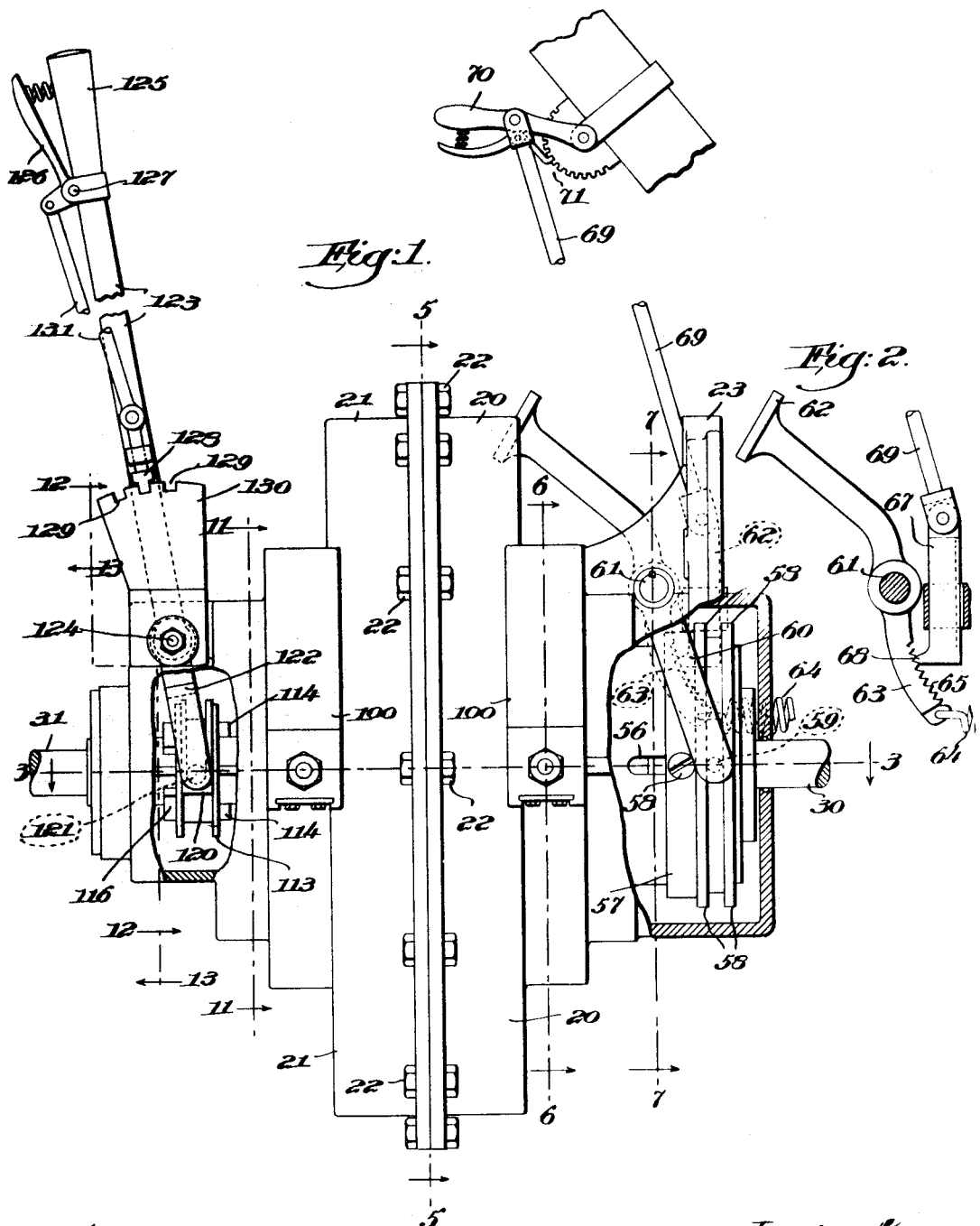
Witness,
Edward F. Allen.
Inventor,
John Reece,
by Rogers, Kennedy & Campbell, his Attys.

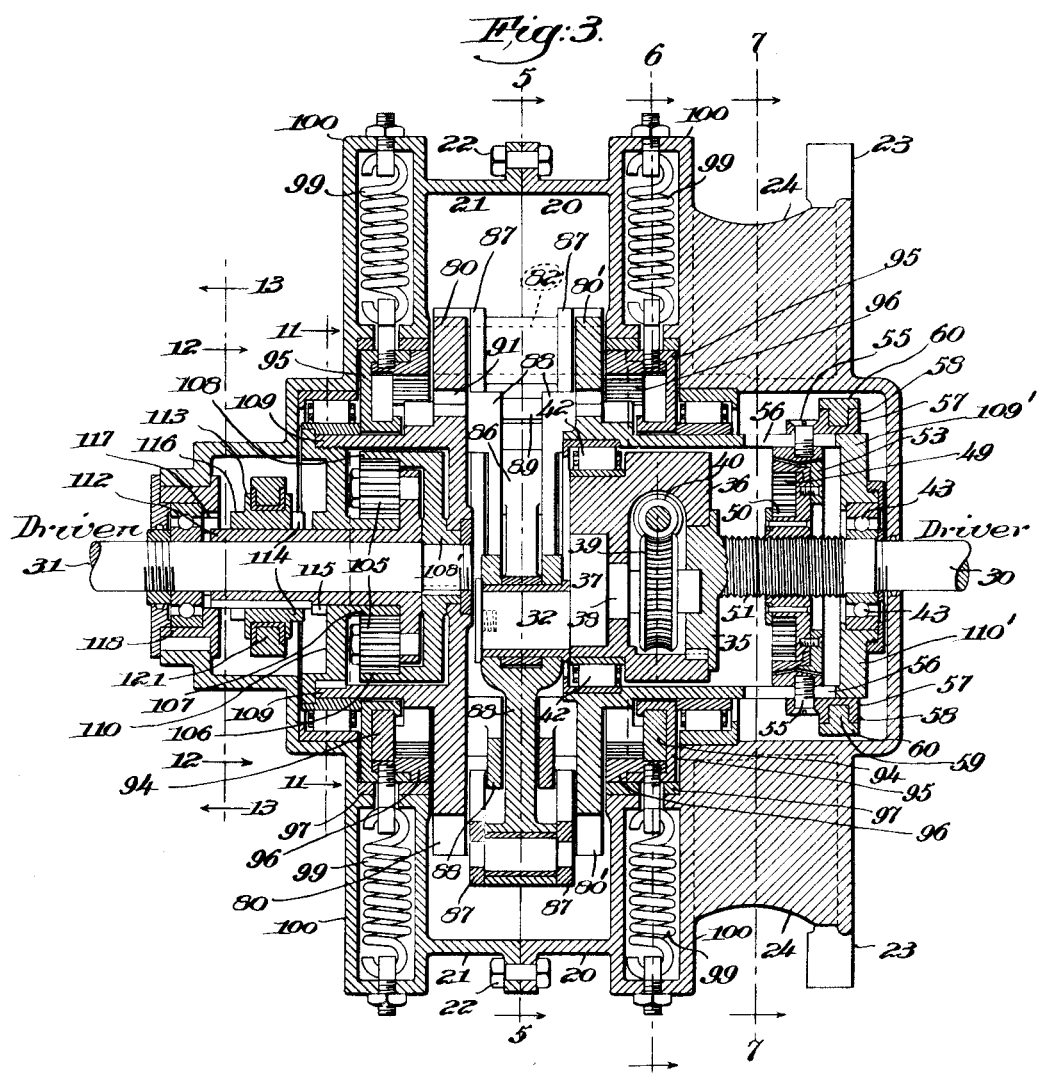

J. REECE.
VARIABLE SPEED TRANSMITTER.
APPLICATION FILED AUG. 12, 1915.
1,198,662.
Patented Sept. 19, 1916.
6 SHEETS—SHEET 3.
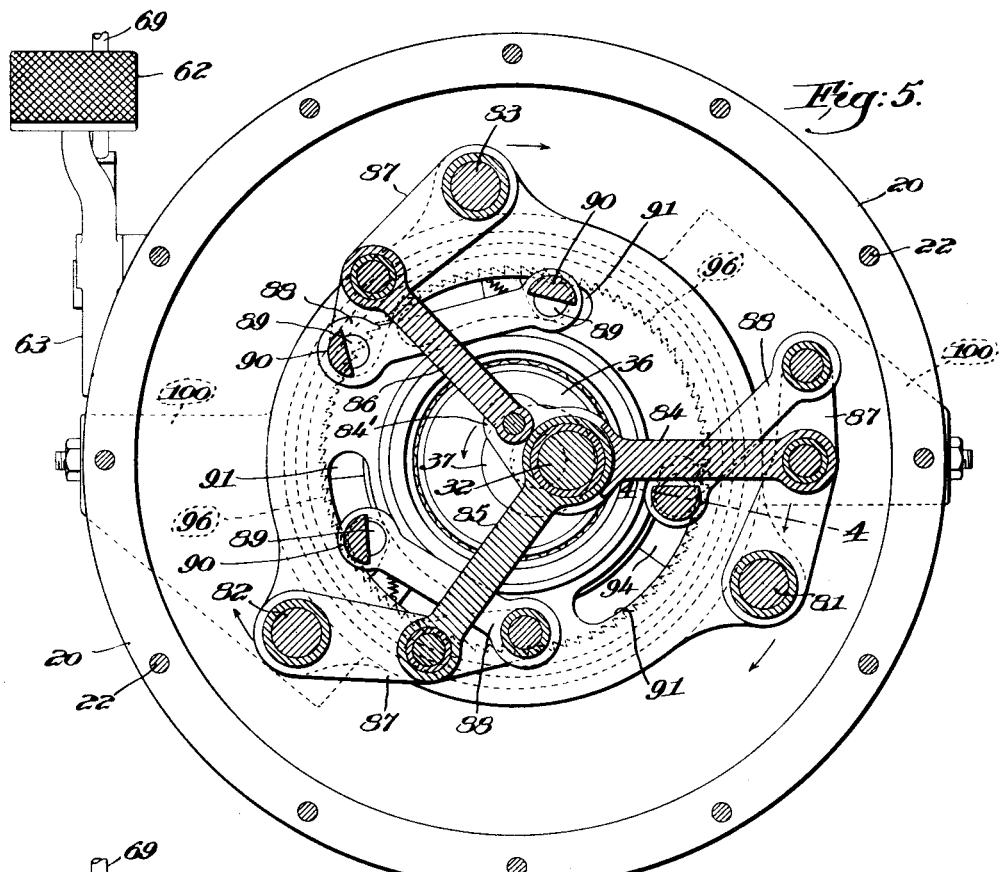
Fig: 5.
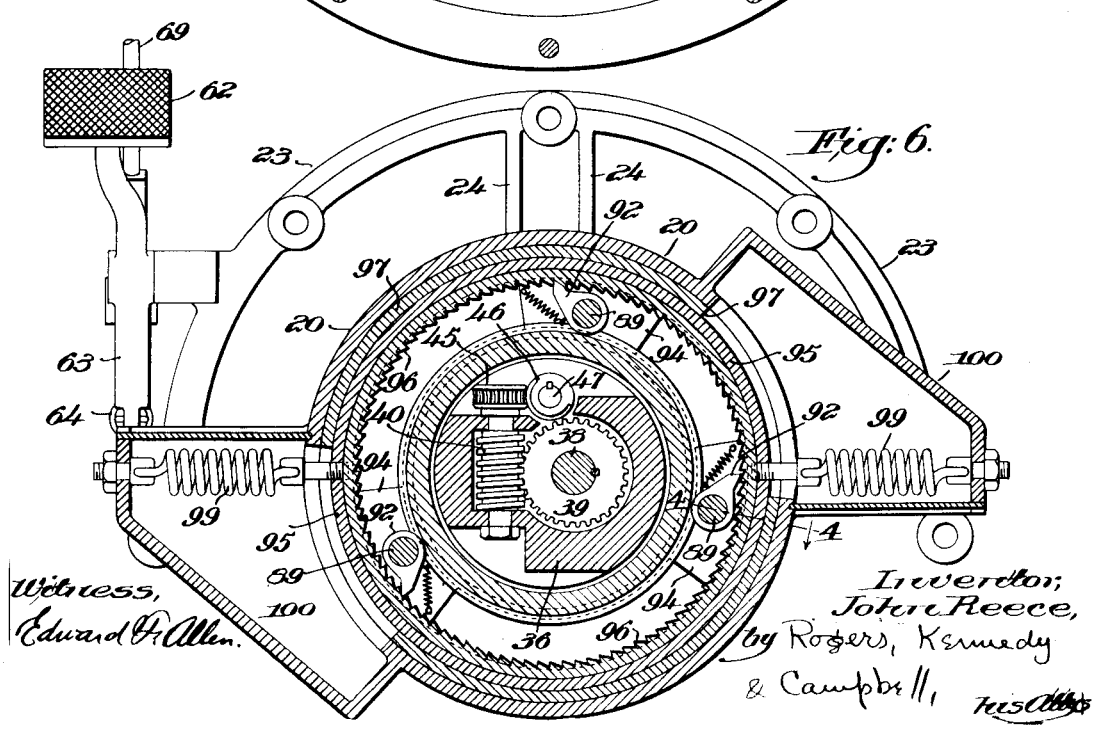
Fig: 6.
Witness,
Edward F. Allen.
Inventor,
John Reece,
by Rogers, Kennedy
& Campbell,
his Attys.

J. REECE.
VARIABLE SPEED TRANSMITTER.
APPLICATION FILED AUG. 12, 1915.
1,198,662.
Patented Sept. 19, 1916.
6 SHEETS—SHEET 4.
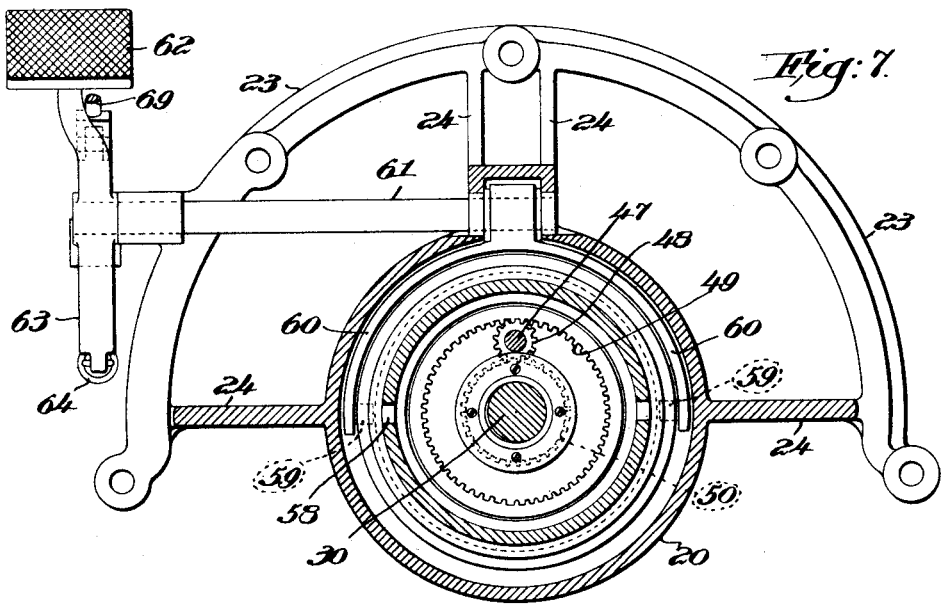
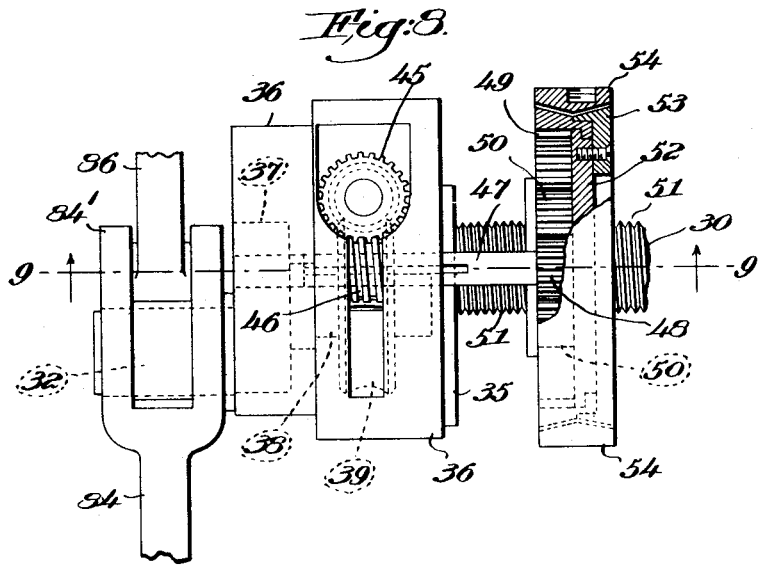
Witness,
Edward F. Allen.
Inventor;
John Reece,
by Rogers, Kennedy & Campbell,
his Atty's.

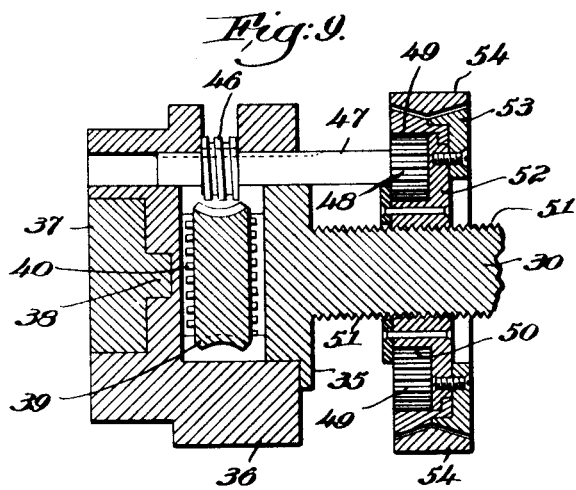
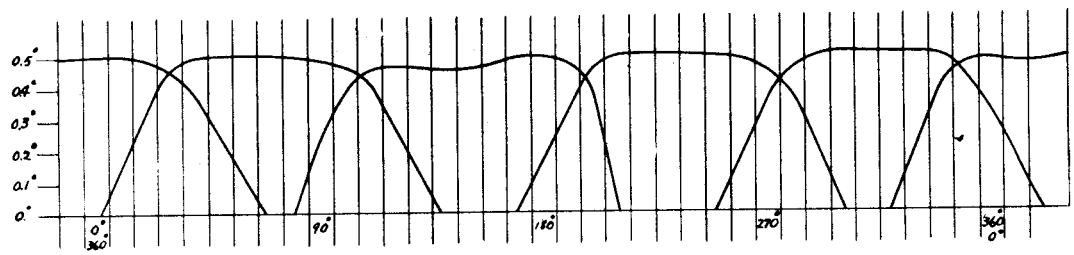

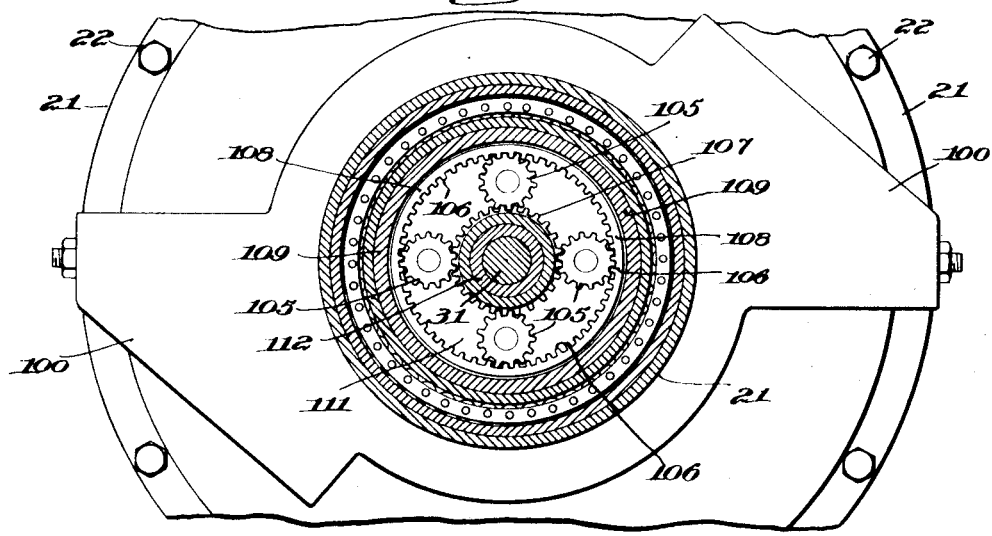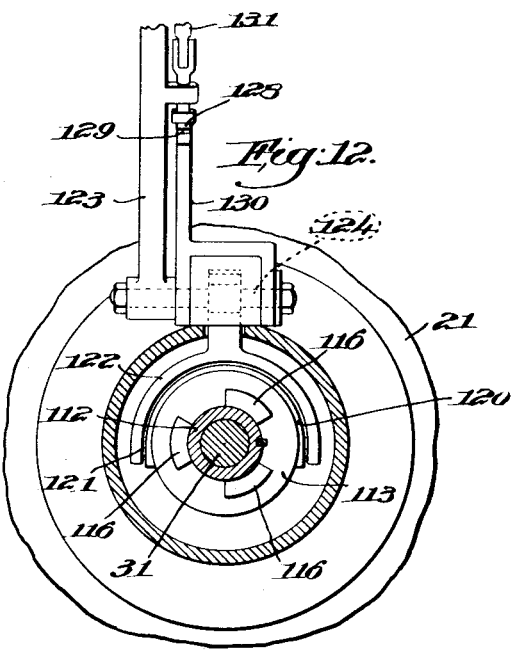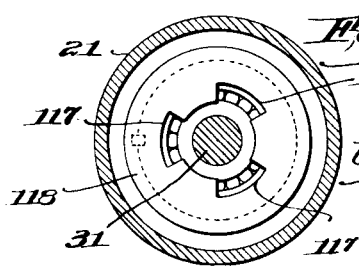

UNITED STATES PATENT OFFICE.

JOHN REECE, OF MANCHESTER, MASSACHUSETTS.

VARIABLE-SPEED TRANSMITTER.

1,198,662.  Specification of Letters Patent.  Patented Sept. 19, 1916.

Application filed August 12, 1915. Serial No. 45,082.

*To all whom it may concern:*

Be it known that I, JOHN REECE, a citizen of the United States, residing at Manchester, in the county of Essex and State of Massachusetts, have invented certain new and useful Improvements in Variable-Speed Transmitters, of which the following is a specification, reference being had therein to the accompanying drawing.

This invention relates to variable speed transmitters, and more particularly to mechanism for transmitting the motion of a rotary driving shaft to a rotary driven shaft with provision for varying the speed ratio. The two shafts may, for example, be respectively connected to the engine and to the wheels of a motor vehicle, the mechanism hereof permitting the speed of the vehicle to be controlled.

Generally the object hereof is to afford an improved and simplified variable speed transmitting mechanism possessing good efficiency of transmission, easily adjustable for varying the speed ratio, capable of giving any desired ratio between the extreme limits of adjustment, capable of reversing the driven shaft, and free from the structural weaknesses and other objections of heretofore known mechanisms.

A particular object hereof is to permit the practical use of an intermittent gripper device, such as a pawl, for actuating the driven shaft by the provision of a practical and efficient link motion or other mechanism between the eccentric or crank on the driving shaft through the gripper to the driven shaft, the mechanism being so arranged and proportioned as to impart to the driven shaft substantially uniform speed of travel through the gripper during each operative power stroke, thus harmonizing the gripper action with the natural tendency of the driven parts to uniform speed.

Another object is to provide such a gripper actuating mechanism which maintains the speed uniformity of the gripper action throughout the adjustment of the mechanism.

Another object is to provide a resilient means or element in the train of connected mechanism in such location and of such character as to eliminate the objection to previous constructions.

Particularly it is an object hereof to avoid or minimize the tendency inherent in mechanisms of this character to pound while in operation.

Another object is to so arrange the mechanism with a plurality, preferably three or more, grippers or pawls that the driven shaft will always be under the full driving action of at least one of the grippers.

Another object is to afford a larger speed ratio than is usually practicable with intermittent gripper mechanisms, and especially by an arrangement, as will be hereinafter described, for effectively securing a full throw of the driving crank or eccentric in less than 180 degrees revolution thereof.

Another object is to afford an advantageous means for effecting the adjustment of the power transmitting parts for varying the speed ratio of the apparatus.

Another object is to secure in an effective way a reversal of the ordinary arrangement by causing the vibrating grippers or pawls to revolve with the driven parts and to maintain the ratchet wheel from revolving by means of a resilient resisting element, whereby the pawls and ratchet are always in effective driving engagement, and the resilient element affords a uniform torque to the driven shaft.

Another object is to provide a novel and efficient mode of fitting a gripper or pawl to the rotary driven parts to permit relative oscillation of the pawl for the purpose of coöperating with a non-revolving ratchet wheel.

Another object is to so construct or arrange the resilient element in the train of connections that it is required to yield only in one direction, whereby any substantial shortening of the effective driving stroke is avoided.

Another object is to secure a more efficient coöperation between the oscillating pawls and the ratchet wheel, namely, by providing the latter with internal teeth.

Another object is to provide an improved mode of varying the speed ratio by altering the throw of the driving crank or eccentric and an improved construction for varying such throw.

Another object is to improve the smoothness of the driving action of the mechanism by providing a construction wherein the ratchet wheel coöperates with at least three driving pawls.

Another object is to provide a novel arrangement of two coöperating control levers moved at the will of the operator in order to secure certain features of convenience and expedience in practical use, as will be hereinafter more fully explained.

Further objects will be elucidated in the hereinafter following description.

To the attainment of the above referred to objects the present invention consists in the novel combinations, mechanisms, devices, arrangements and details hereafter referred to or illustrated in the accompanying drawings, which show one embodiment of the present invention.

In the accompanying drawings forming a part hereof, Figure 1 is a left elevation, partly in section, of a variable speed transmitter embodying the present invention, the same shown in a form adaptable for use upon motor vehicles and illustrating the general arrangement of control levers suitable therefor. Fig. 2 in left-hand elevation shows a detail of the lever control mechanism. Fig. 3 is a central horizontal section of the mechanism shown in Fig. 1, taken on the plane 3—3. Fig. 4 is a section taken on the plane 4—4 of Fig. 5, showing a detail of the driving pawl construction. Fig. 5 is a vertical cross-section taken on the plane 5—5 of Fig. 1 or Fig. 3. Fig. 6 is a similar section taken on the plane 6—6 of Fig. 1 or Fig. 3. Fig. 7 is a similar section taken on the plane 7—7 of Fig. 1 or Fig. 3. Fig. 8 is a plan view of the variable throw crank mechanism. Fig. 9 is a section on the plane 9—9 of Fig. 8. Fig. 10 is a diagram showing the driving action of the pawls upon the driven shaft. Fig. 11 is a vertical section taken on the plane 11—11 of Fig. 1 or Fig. 3. Fig. 12 is a similar section taken on the plane 12—12 of Fig. 1 or Fig. 3. Fig. 13 is a similar section taken on the plane 13—13 of Fig. 1 or Fig. 3, looking in an opposite direction.

Referring to the illustrated mechanism in detail, some of the main parts may be first described as follows. The frame of the apparatus is in the form of a casing having a front casing portion 20, a rear casing portion 21 and bolts 22 securing them together in such way as to form an oil-tight housing for the inclosed transmitting mechanism. The front casing portion 20 may be provided with an integral flange 23 adapted to be bolted directly to the frame or support of the engine, so as to practically make a single unit out of the engine and transmission. It will be understood that the engine shaft may be integral with or connected to the driving shaft, to be hereinafter described, and the engine fly-wheel may be located in close proximity to the extreme front portion of the transmission casing part 20. The casing flange 23 may be strengthened by the provision of ribs 24.

Referring now more particularly to Fig. 3, the driving or engine shaft 30 is seen projecting at the right, and what may be termed the driven shaft 31, connected eventually to the vehicle wheels, is seen projecting at the left. These two shafts 30 and 31 are arranged in mutual alinement and are provided with suitable bearings at the points where they enter the transmission housing. The interior ends of the two shafts are spaced apart from each other, leaving an intermediate space for accommodating a part of the transmitting mechanism by which power is transmitted from shaft 30 to shaft 31. In a general way, it should be explained at this point that, in addition to the transmitting mechanism referred to, there are certain auxiliary mechanisms which will be separately described hereinafter. Thus, the interior end of the driving shaft is provided with an eccentric device, such as a crank, and adjusting mechanism is provided for altering the throw of this crank, so as to change the speed ratio of the apparatus. This crank-throw adjusting mechanism is generally located at the right-hand part of Fig. 3, surrounding or in proximity to the driving shaft. There is also embodied in the apparatus hereof a reversing mechanism, permitting the direction of rotation of the driven shaft to be reversed at will. This reversing mechanism is generally located at the left-hand, partly surrounding the driven shaft.

For convenience, I will first describe the details of the crank-throw varying mechanism and thereafter the details of the transmitting mechanism between the two shafts, and, finally, the driven shaft reversing mechanism.

Near the center of the apparatus, as seen in Fig. 3, is the eccentric or crank pin 32, which is moved circularly constantly in one direction by the driving shaft through the connections about to be described, and which, in turn, through a system of connecting rods and other transmitting mechanism, effects the desired rotation of the driven shaft. It will be understood that the crank pin 32 in the normal running of the apparatus, is in rigid relation with the driving shaft 30. The crank pin, however, is not directly connected by a simple web with the driving shaft, but is connected by a special and novel adjustable arrangement of the parts, which are associated with other parts for effecting such adjustment, so as to change the throw of the crank. These parts for permitting adjustment and for effecting adjustment are the parts which are now about to be described.

The interior end of the driving shaft is enlarged in the form of a disk 35, which is permanently and rigidly connected to a hollow block 36, this block being generally circular and concentric with the driving shaft, and the crank pin 32 is connected to the block 36 by means of a circular disk 37 integral with the crank pin and fitted in an eccentric, circular recess at the inner side of the block 36. The arrangement is such that the eccentricity or throw of the crank pin 32 can be varied from the maximum throw, which is shown in the figures, to any desired minimum throw, such as a zero throw or concentric condition. This adjustment is permitted by the fact that the crank pin disk 37 is eccentrically arranged in the block 36, while the crank pin 32 is eccentrically arranged on the disk, as shown. As the parts are arranged, the eccentricity of the crank pin with respect to the driving shaft, is the sum of the eccentricities of the disk 37 with respect to the driving shaft and of the crank pin with respect to the disk. If the crank pin and disk were circularly adjusted in the block, the crank pin would gradually be brought radially nearer to the axis of the driving shaft, and eventually the crank pin axis would coincide with that of the driving shaft by reason of the fact that the two eccentricities are equal in amount. The mechanism for effecting such crank pin adjustment to alter its effective throw may, for convenience, be as follows: The disk 37 is shown as provided with a short fulcrum shaft or stud 38, which is carried eccentrically in the block 36, so as to permit rotary adjustment. The parts 32, 37 and 38 are shown as one integral piece of metal. Within the hollow interior of the block 36 and fixed upon the fulcrum stud 38 is shown a worm wheel 39, which is engaged by a worm 40. Obviously by turning the worm 40 it is possible to rotate the worm wheel 39 and thereby adjust the crank pin 32 as desired. At the same time the worm-and-wheel device prevents any back-throw or lost motion, and this construction, in connection with the solid mounting of the hollow block 36, renders the composite crank construction extremely strong, durable and efficient. It should be here stated that the circular hollow block 36 is shown as carried by a roller bearing 42, while the driving shaft 30 is shown as carried by ball bearings 43. These two bearings are not carried directly by the frame, but by a surrounding rotating part, to be referred to at a later part of the description (109', 110').

In continuing the description of the parts by which the throw of the crank 32 is adjusted, we must pass from Fig. 3 to Figs. 6, 8 and 9. The worm 40, by which the crank adjustment is effected, is shown in Fig. 6 as provided with a short worm shaft at the end of which is a second worm wheel 45, this latter worm wheel being engaged by a second worm 46. The worm 46 is splined to a shaft 47, which, as shown in Figs. 8 and 9, extends forwardly, carrying a pinion 48 at its extremity. The problem now is to effect any desired or suitable amount of rotation in one direction or the other of the pinion 48, so that, through the connections already described, the crank pin throw may be adjusted. Moreover, this rotating of pinion 48 must be effected during the running of the apparatus, that is, while the pinion itself is bodily planetating about the driving shaft. The following described connections are devised for these purposes: Pinion 48 is shown as in constant mesh with an internal gear 49 and an ordinary gear 50, both arranged concentrically with the driving shaft 30. Normally this entire system is substantially unitary or rigid and is revolving at full speed with the driving shaft. The gear 50 has its hub interiorly screw threaded to engage a corresponding screw threaded portion 51 of the driving shaft 30, the purpose of which will shortly be described. The hub of the gear 50 is also provided with an outwardly extending plate or flange 52, at whose peripheral part is bolted a ring 53. The plate and ring might be integral, but are shown as capable of being separated and bolted together in order to afford an annular recess for accommodating, and therefore affording a bearing for, an annular flange extension of the internal gear 49, as clearly shown in Figs. 3, 8 and 9. The purpose of this described construction is to permit a retarding or braking effect to be applied at will to either the gear 50 or the internal gear 49. Such a retarding effect, while operative, destroys the substantial rigidity of the system and causes the pinion 48 to rotate on its own axis, and therefore adjust the crank throw. Retarding the gear 50 causes a rotation of the pinion 48 in such direction as to increase the throw of crank 32, whereas a drag upon the internal gear 49 will effect a decrease of crank throw. A study of Fig. 7 will make clear this action. Understanding that normally all the parts are turning in unison counter-clockwise, if we apply a drag so as to bring the gear 50 to rest, this necessarily compels the pinion 48 to turn counter-clockwise as it planetates. Conversely, the anchoring of the internal gear will cause the pinion to rotate clockwise as it planetates. To effect this operation under control, I have shown provided the following mechanism: The ring or internal gear 49 and the ring 53 connected with the internal gear 50 are shown as located in proximity to each other, both of them having inclined or conical peripheral faces, as clearly seen in Figs. 3, 8 and 9. Surrounding these rings is a double-acting brake ring or retarding device 54, having a pair of conical faces opposed respectively to the conical faces of rings 49 and 53. When this brake ring 54 is moved to the left, Fig. 8, it engages and retards the ring of the internal gear 49, and when moved in the opposite direction it retards the other ring. The double brake ring 54 is supposed to have a sliding fit to permit it to move axially within a cylindrical, rotating member 109', which has not yet been described, and the movements of the brake ring are effected through the following connections, which extend through the wall of the rotating cylinder. Thus, a plurality of screw studs 55 extend from the brake ring 54 through longitudinal slots shown at 56 in the surrounding cylinder, and externally are rigidly connected with a sleeve device 57, which is doubly flanged at 58, forming an annular groove, which is engaged by a pair of opposite studs or pins 59. (See Figs. 3 and 1). These studs, (see Fig. 7), are held at the opposite ends of a yoke 60, which is located within the casing and extends around the sleeve 57 to diametrically opposite points. The yoke at its upper part is fulcrumed in the casing by a fulcrum shaft 61, which extends leftward, as shown in Fig. 7, and at its left extremity is provided with a control lever or treadle 62, (see also Fig. 1). This lever has an extension 63 normally pressed by a spring 64, so as to tend to effect an adjustment to increase the speed ratio, the depression of the treadle serving to decrease the speed ratio. By this arrangement the operator only needs to place his foot upon the pedal for the purpose of reducing the speed ratio below that to which it has been set.

The purpose of the threaded shaft portion 51 of the driving shaft will now be understood. Referring more particularly to Figs. 3, 8 and 9, if the operator shall move the double clutch ring 54 to the right for a given extent by means of the control handle, this causes, as already explained, a drag upon the gear 50, whose hub is in screw-threaded engagement with the shaft portion 51. The retarding or anchoring of the gear 50 causes the pinion 48 to rotate clockwise, thus performing its speed varying functions. During this operation the internal gear 49 is turned rapidly, but idly. The gear 50, however, which has been anchored, is caused, by the screw threads on the shaft 30, to travel toward the right, which it continues to do as long as the ring 54 is moved toward the right. Indeed, the gear system promptly follows any movements of the clutch ring, owing to the feeding action of the shaft. It follows that clutch ring shifting movements of different extent will be accompanied by rotations of the pinion 48 of proportionate extent, and in this way the operator is able to accurately control the adjustment of the eccentricity of the driving crank 32. Leftward shifting movements of the double clutch ring 54 impose a drag upon the internal gear 49, this in turn, as already described, causing the pinion 48 to rotate counter-clockwise in Fig. 7. This in turn causes the gear 50 to rotate rapidly clockwise in Fig. 7; indeed, a faster speed than the shaft 30, so that relatively there is caused an axial shifting movement of the gear system toward the left in Figs. 8 and 9. Thus, for any movement of the double clutch ring 54 in either direction the gear system instantaneously responds with a proportional shifting movement, and this is accompanied by a pinion rotation of the proportionate amount and in the proper direction to secure the driving crank adjustment desired.

A convenient adjunct to the described mechanism is one for determining or limiting the normal running speed of the apparatus, (see Figs. 1 and 2). When the pedal 62 is released to its full extent, the apparatus is set for its maximum speed, which is usually undesirable. The purpose of the adjunct about to be described is to enable the operator to fix by hand the maximum speed ratio which he expects to use and thereafter to effect all speed changes below such speed by foot and thus avoid the necessity of taking one hand from the steering wheel when any speed changes are to be made. The extension 63 of the pedal is utilized for this purpose, it being shown in Fig. 2 as of curved form and notched or toothed at 65 of its front side. A sliding rod 67, having a single tooth 68, is so located as to permit adjustment of the tooth 68 to engage with any one of the teeth formed at 65 on the pedal extension. Thus, a vertical adjustment of the rod 67 permits the tooth 68 to be brought opposite any desired one of the teeth 65, and, owing to the curved or inclined character of the extension 63, it results that each different adjustment of the rod 67 affords a different limiting adjustment of the pedal movements. The adjustment of the rod 67 may be made accessible by means of a connecting link 69 extending upwardly to a convenient handle 70, for example, on the steering post of the motor vehicle. Moving the handle 70 up and down sets the tooth 68 to different positions, as desired, and a simple locking device 71 may be applied for preserving the desired adjustment.

The operation of these devices will be better understood by describing the mode of starting the motor vehicle. It will be understood that the foot pedal 62 is at its forward or zero position when the motor car stands idle. It is held in this non-driving position by the tooth 68. The operator, to start up the car, will exert pressure on the pedal, so as to disengage the extension 63 from tooth 68, and thereupon, by hand, he will lift the handle 70 to the desired point, this in turn lifting the tooth 68 to a point corresponding to any given desired speed ratio. The operator then merely has to gradually release the pressure on the pedal, allowing it to swing forwardly under the influence of its spring until extension 63 and tooth 68 again engage, during which adjustment the speed ratio has been gradually increased from zero to the ratio predetermined by the handle adjustment.

I will now describe the mechanism or connections by which the crank pin 32 effects the driving of the driven shaft 31. For this purpose the driven shaft is provided with a plate-like flange or web 80, which turns rigidly with the driven shaft in the normal operation of the apparatus, this web having a generally circular shape and provided near its periphery with a plurality of pins 81, 82, 83, which are in the nature of crank pins. Three of these are shown. They extend toward the right in Fig. 3, so that each one stands substantially in the plane of rotation of the driving crank 32.

Some of the driven parts which are connected with the crank pins 81, 82, 83, at the left of Fig. 3 are substantially duplicated at the right. This is done for symmetry, added strength and easier running qualities. Thus, the driven crank web 80 has its counterpart at the other side in the flange or plate-like member 80', and rigidly connected with the flange 80' are a cylindrical portion 109' and at the forward end a flange or cap portion 110', all of which rotate with the driven shaft.

The driving is actually performed by a reaction between the driving crank and the three driven cranks, with the assistance of a plurality of intermittent gripper devices, one or a pair for each of the driven cranks. (See particularly Figs. 3, 4, 5 and 6). There are three connecting rods extending from the driving crank 32, each of which is connected to one of the driven crank pins by a system of levers and links. The connecting rod 84 for the pin 81 connects directly with the driving crank by a hub or sleeve. The connecting rod 85 for the pin 82 has its hub or sleeve mounted exteriorly to that of the connecting rod 84. The connecting rod 86 for the pin 83 is connected for compactness to one of a pair of ears 84' of the connecting rod 84, all as seen in Fig. 5.

The three connecting rods 84, 85, 86, do not extend directly to the driven crank pins 81, 82, 83, but, on the contrary, each of the pins is provided with an oscillating lever 87, or rather, for symmetry, with a pair of such levers, as shown in Figs. 3 and 5. The levers 87, it will be understood, oscillate loosely about the driven crank pins, as compelled by the movement of the driving crank acting through the respective connecting rods. The connection between each of the connecting rods 84, 85, or 86 with the lever 87 is an ordinary pivot stud connection, and this pivot is located at an intermediate point in the length of the lever, the lever extending farther to a point at which a pair of pawl-actuating links 88 are connected. These three link pairs 88 will be substantially alike, having the same mode of operation, although, owing to the different fitting of the connecting rod 86, the corresponding link will have somewhat different proportions.

It will be understood that the several pawls 92, hereinafter to be described, are arranged to engage with a non-rotatable ratchet wheel. The described arrangement of driving crank, connecting rods, oscillating levers and links is such that the rotation of the driving crank causes the to-and-fro movement of the rods, levers and links, so as to tend to move the three pawls in arcs concentric with the shafts of the apparatus. The ratchet wheel, being non-rotatable, cannot be driven, and therefore the driven crank shaft web 80, on which the levers 87 are mounted, is compelled to rotate, carrying the driven shaft with it. The mode of action of this link motion will be obvious from Fig. 5 and need not be particularized.

The links 88 do not carry the pawls directly at their ends, but, on the contrary, the construction is as follows. The links, which are provided in pairs, as seen in Figs. 3 and 4, carry rigidly at their extremities shouldered cross shafts 89, shown best in Fig. 4. The central portion of each of these shafts 89 is shown as machined out into a crescent form 90, merely for the purpose of clearance. Each of the cross shafts 89 extends laterally, that is, parallel to the driving and driven shafts of the apparatus, and at each side passes through slots formed at 91 in the driven shaft webs 80 and 80'. These slots are arc-shaped, and sufficiently wide and long to give free play to the shaft 89 in its relative to-and-fro movements.

Near each end the cross shaft 89 carries a pawl 92, these being the pawls previously referred to. There will, therefore, be a total of three pairs, or six, driving pawls. Each pawl is provided with a spring tending to hold it engaged with the ratchet wheel. To properly guide the pawls 92, the pawl-carrying shaft 89 and the links 88, the extremities of the shaft are provided with sliding segments 94, these being arc-shaped pieces concentrically engaging in annular recesses or guideways formed in guide pieces 95, as seen in Figs. 3 and 4. The pawls 92 coöperate with a pair of internal ratchet wheels 96 located outside the respective webs 80, 80'. For convenience each segment guide piece 95 and ratchet wheel 96 may be rigidly secured together. Since there will be a certain amount of oscillatory movement of the ratchet, it is shown as surrounded by a stationary bearing ring 97.

Referring to Fig. 6, it will be seen that the three pawls 92 in their relative oscillating movement upon the nonrotating ratchet wheel will tend always to cause advancement clockwise of the driven parts of the machine. Each pawl intermittently advances on the ratchet and then grips it during its driving action. The arrangement and timing of the three pawls is such that there will always be at least one, and sometimes two, pawls in actual driving engagement with the ratchet. If we represent the driving action of each pawl by a vertical line or ordinate upon the diagram of Fig. 10, the base representing the rotary travel of the driving shaft, we will secure a diagram substantially as seen in Fig. 10, in which the driving action of each pawl overlaps the preceding and succeeding driving actions of the other two pawls. The particular link motion shown in Fig. 5 has an important advantage which does not pertain to an ordinary crank-driven pawl. The latter would have an extremely short and ineffective extent of full driving action. The driving curve on the diagram would show an apex which would be substantially a point. The link motion illustrated, however, tends to bring the pawl, when once engaged with the ratchet, into a condition of full driving action, as the diagram makes clear. The result of this, in connection with the overlapping actions of the successive pawls, is to give an almost continuous and steady driving action upon the driven parts. In other words, one pawl will transmit the driving power at the maximum or normal rate in a steady manner until its work is finished, and immediately thereafter the succeeding pawl will take the burden of the driving action, so that the effect upon the driven parts is practically the equivalent of a constant drive. Without attempting to fully explain the reasons for this smoothness or steadiness of driving action, I will merely refer to the fact, as evident on Fig. 5, that, as to each pawl, when the driving crank is given its maximum movement or throw, the action of the lever 87 upon the pawl is at its minimum, and vice versa. Thus, as seen in Fig. 5, the driving crank is exerting a minimum or zero effect upon the lever carried on the driven crank 81, whereas that lever is exerting a maximum effect upon the pawl. In the case of the lever carried by the driven crank 82, conditions are reversed and the driving crank is exerting substantially a maximum effect upon the lever, while the lever is exerting its minimum effect upon the pawl. The pawl in this case is at its position of nearest approach to the driven crank 82. In the first case the pawl is at its maximum distance from the driven crank 81.

In order to still further steady and smooth the driving action of the apparatus and to substantially eliminate any irregularities of the diagram, Fig. 10, and afford a practically steady or continuous straight diagram of driving, I have rendered each ratchet wheel 96, not fixed, but yieldingly held or floating within its bearing ring 97. Thus I have introduced a strong resilient element or spring 99. Preferably there will be two of these springs, and there is shown one at each side. Each spring is permanently connected to a portion of the ratchet wheel and at its other end to a fixed part of the casing of the apparatus. The action of the spring is to permit a slight yielding at certain times and a reassertion of the spring at other times, so as to counterbalance any irregularities in the driving action and without any consequent loss of power therein. I prefer to arrange the springs 99 in a generally radial direction as seen in Fig. 6, not only for the convenience of such arrangement, but in order that, when the apparatus is driving, there is room afforded for the yielding advance or adjustment of the ratchet to different circumferential positions. When the load is light, the spring will be extended to a certain degree, and when the load is heavier, the spring will be further extended, and in each of these conditions the spring will have a substantially steady or normal position from which it will vary slightly in either direction during each shaft rotation to secure steadiness of drive, as previously mentioned. It will be seen that the pull of the spring always represents the torque of the driven shaft, for, if the ratchet were permitted to freely rotate, the entire driving action would take effect to rotate the ratchet rather than the driven shaft. Each spring 99 is shown for convenience as inclosed within a casing part 100, and at the point where the spring connects with the ratchet both the casing 21 and the stationary bearing 97 are slotted, as clearly seen in Figs. 3 and 6.

An important feature of advantage in the Fig. 5 link motion of the particular ratchet arrangement shown is that I am enabled to secure a relatively high speed ratio, such as two of the driving shaft to one of the driven shaft, and with a comparatively slight oscillatory movement of the intermediate transmitting parts; also that the number of pawl impulses per rotation of the driven shaft is greater than would be the case with a rotating ratchet driven by a vibrating, revolving pawl. The reasons for these advantages may be explained as follows. Referring to Fig. 5, the driving shaft and crank are supposed to be rotating counter-clockwise, as shown by the arrow, while the driven cranks and shaft are rotating in the opposite direction, or clockwise. It follows that a full crank throw will be imparted to the levers in less than 180 degrees. This is my preferred arrangement. Assuming a speed ratio of five to one, the driven shaft, which rotates reversely, would have six rotations when considered relatively to the driving shaft, and therefore six actuations of each pawl, or eighteen pawl impulses. In other words, there would be eighteen driving impulses for each driven shaft rotation. With a rotating ratchet and non-rotating pawls, on the other hand, there would only be fifteen impulses, and the difference between fifteen and eighteen represents a gain in smoothness and also enables a higher speed ratio to be attained with a given extent of oscillation of the intermediate parts. Or, on the assumption of a two to one speed ratio, we would find that the present improvement has increased the number of impulses from three to four and one-half per rotation of the driven shaft, a 50% increase. It will thus be further seen that at the higher speed ratios we have secured the greater benefit from the described arrangement.

For changing over the mechanism to drive the driven shaft reversely, instead of forward, the following means may be employed, (see particularly Figs. 1, 3, 11, 12 and 13). I employ a sun-and-planet gearing, best shown in Fig. 11, but seen also in cross-section in Fig. 3. This involves a series of planet pinions 105, each of which engages an internal gear 106 and an ordinary or external gear 107. According to whether the planetary gearing is substantially in locked relation, or, on the other hand, is active, determines the forward or reverse driving of the mechanism. The internal gear 106 is in rigid relation with the driven shaft. Thus, in Fig. 3, it is shown as formed at the extremity of a cup-shaped piece 108, whose hub 108' is keyed to the driven shaft 31. The external gear 107, on the other hand, is rigidly connected with the web 80 of the driven shaft crank. Thus, the crank web 80 is shown as provided with a rearwardly extending flange 109. To the extremity of this flange is rigidly connected by screw threads, or otherwise, a circular member 110 surrounding the driven shaft and shown as formed integral with the external gear 107. The pinions 105, of course, run between the internal and external gears, as seen in Figs. 3 and 11. These pinions are all carried on the flange portion 111 of a sleeve 112, which surrounds and runs loosely about the driven shaft 31. This sleeve, and therefore the pinions, are capable of being locked rigidly with the driven shaft crank web 80 through the member 110, or, on the other hand, rendered stationary for the purpose of reversing the driven shaft rotation. For effecting this purpose, the sleeve 112 at its rear end is shown as surrounded by a toothed clutch 113, which is keyed to the sleeve, so as to be capable of axial sliding thereon. This clutch member 113 is provided with three teeth 114 at its forward end adapted to engage with corresponding recesses formed at 115 in the member 110, which rotates rigidly with the driven shaft crank. Similarly the rear end of the clutch member 113 is provided with three clutch teeth 116 adapted to engage in recesses formed at 117 in a casting 118, which is held rigidly at the rear extremity of the casing member 21. The tooth-and-recess arrangement 114—115 and the arrangement 116—117 are substantially alike and are sufficiently illustrated in detail in Figs. 3, 12 and 13.

It is clear from the above described arrangement that, if the clutch member 113 is shifted forwardly so as to lock together the sleeve 112 and the member 114 carried by the driven crank web, the entire planetating gearing arrangement is rendered substantially rigid, so that the pinions are incapable of running upon their gears, and thereby the driven cranks are rendered substantially rigid with the driven shaft, so that we have an action of forward driving. If, on the other hand, the clutch member 113 is shifted rearwardly, this will render stationary the pinion-carrying sleeve 112, so that the pinions are held from planetating, the result being that the external gear 107, rotated by the driven web 80, acts through the pinions to drive reversely the internal gear 106, and, the latter being keyed to the driven shaft, causes the driven shaft to rotate reversely. The proportions of the several gears are such that the reverse driving speed of the driven shaft is less than its forward driving speed in the proportion of substantially two to one.

In order to effect the forward and rearward shifting movements of the reversing clutch member 113, the following convenient arrangement may be adopted. The clutch member 113 is provided with a pair of outwardly extending flanges between which, as seen in Figs. 3 and 12, is engaged a semi-annual piece 120 which in turn is engaged by inwardly projecting studs 121 formed at the opposite sides of a yoke 122. This yoke is formed at the lower extremity of a lever arm 123, which is pivoted at 124, as seen also in Fig. 1. The upper end of the lever 123 is formed with a handle 125 and has co-acting therewith the spring-pressed bell crank lever 126 pivoted at 127 to the lever arm 123. A locking dog 128, adapted to engage notches 129 of a plate 130, fast to the casing 21, is connected to the bell crank lever 126 by the link 131, whereby the lever arm 123 may be locked in the desired position, namely, in neutral or forward or reverse position. The notch at the left is the one engaged for forward driving, the middle one for disengaging the clutch 113, the right-hand notch for reverse driving.

It will thus be seen that I have described a variable speed transmission embodying the principles and attaining the objects and advantages hereinbefore recited.

Many matters of arrangement, combination, detail and other features may be varied without departing from the main principles involved, and it is therefore not intended to limit the invention to such features except in so far as specified in the appended claims.

What is claimed is:

1. In a variable speed transmission the combination of a driving shaft, a driven shaft, a pawl fitted to travel concentrically with the driven shaft and capable of relative vibration during such travel, connections from the driving shaft for causing such pawl vibration, and a ratchet engaging said pawl and held against rotation whereby the pawl compels the driven shaft to rotate.

2. In a variable speed transmission the combination of a driving shaft, a driven shaft, a pawl fitted to travel concentrically with the driven shaft and capable of relative vibration during such travel, a crank and lever connections between the pawl and driven shaft, connections from the driving shaft for causing such pawl vibration, and a ratchet engaging said pawl and held against rotation whereby the pawl intermittently compels the driven shaft to rotate.

3. In a variable speed transmission the combination of a driving shaft carrying a crank, a driven shaft in alinement with said driving shaft and carrying at least one crank, a pawl indirectly carried by said driven crank, connections from the driving crank for causing said pawl to concentrically vibrate relatively to the driven crank, and a concentric ratchet held against rotation and engageable by said pawl, whereby the pawl intermittently engages the ratchet and when so engaged transmits the driving power through the driven crank to the driven shaft.

4. In a variable speed transmission the combination of a driving shaft, a driven shaft, a pawl fitted to travel concentrically with the driven shaft and capable of relative vibration during such travel, connections from the driving shaft for causing such pawl vibration, including a variable throw driving crank and a connecting rod extending therefrom, and a ratchet engaging said pawl and held against rotation whereby the pawl compels the driven shaft to rotate.

5. In a variable speed transmission the combination of a driving shaft, a driven shaft, a pawl fitted to travel concentrically with the driven shaft and capable of relative vibration during such travel, connections from the driving shaft for causing such pawl vibration, and a ratchet engaging said pawl and held against rotation whereby the pawl compels the driven shaft to rotate, said parts being so arranged that the driven shaft rotates oppositely to the driving shaft.

6. In a variable speed transmission the combination of a driving shaft carrying a crank, a driven shaft in alinement with said driving shaft and carrying at least one crank, a pawl indirectly carried by said driven crank, connections from the driving crank for causing said pawl to concentrically vibrate relatively to the driven crank, and a concentric ratchet held against rotation and engageable by said pawl, whereby the pawl intermittently engages the ratchet and when so engaged transmits the driving power through the driven crank to the driven shaft, said parts being so arranged that the driven shaft rotates oppositely to the driving shaft.

7. In a variable speed transmission the combination of a driving shaft, a driven shaft, a pawl fitted to travel concentrically with the driven shaft and capable of relative vibration during such travel, connections from the driving shaft for causing such pawl vibration, including a variable throw driving crank and a connecting rod extending therefrom, and a ratchet engaging said pawl and held against rotation whereby the pawl compels the driven shaft to rotate, said parts being so arranged that the driven shaft rotates oppositely to the driving shaft.

8. In a variable speed transmission the combination of a driving shaft, a driven shaft, a pawl fitted to travel concentrically with the driven shaft and capable of relative vibration during such travel, connections from the driving shaft for causing such pawl vibration, and a ratchet engaging said pawl and held resiliently against rotation whereby the pawl compels the driven shaft to rotate.

9. In a variable speed transmission the combination of a driving shaft carrying a crank, a driven shaft in alinement with said driving shaft and carrying at least one crank, a pawl indirectly carried by said driven crank, connections from the driving crank for causing said pawl to concentrically vibrate relatively to the driven crank, and a concentric ratchet held resiliently against rotation and engageable by said pawl, whereby the pawl intermittently engages the ratchet and when so engaged transmits the driving power through the driven crank to the driven shaft.

10. In a variable speed transmission the combination of a driving shaft, a driven shaft, a pawl fitted to travel concentrically with the driven shaft and capable of relative vibration during such travel, connections from the driving shaft for causing such pawl vibration, including a variable throw driving crank and a connecting rod extending therefrom, and a ratchet engaging said pawl and held resiliently against rotation whereby the pawl compels the driven shaft to rotate.

11. In a variable speed transmission the combination of a driving shaft, a driven shaft, a pawl fitted to travel concentrically with the driven shaft and capable of relative vibration during such travel, connections from the driving shaft for causing such pawl vibration, and a ratchet engaging said pawl and held resiliently against rotation whereby the pawl compels the driven shaft to rotate, said parts being so arranged that the driven shaft rotates oppositely to the driving shaft.

12. In a variable speed transmission the combination of a driving shaft, a driven shaft, a pawl fitted to travel concentrically with the driven shaft and capable of relative vibration during such travel, connections from the driving shaft for causing such pawl vibration, including a variable throw driving crank and a connecting rod extending therefrom, and a ratchet engaging said pawl and held resiliently against rotation whereby the pawl compels the driven shaft to rotate, said parts being so arranged that the driven shaft rotates oppositely to the driving shaft.

13. In a variable speed transmission the combination of a driving shaft, a driven shaft, and an intermittent gripper device consisting of a pair of co-acting gripping members, such as pawl and ratchet, actuated by the driving shaft for driving the driven shaft, one of said members intermittently revolving around concentrically with a shaft and indirectly connected to both shafts, and the other member held against revolving.

14. In a variable speed transmission the combination of a driving shaft, a driven shaft, a pair of intermittent gripping members, one revolving with a shaft, the other held against revolving, and connections between the driving shaft and said revolving member and the driven shaft adapted to cause transmission of power from shaft to shaft when the members are gripped.

15. In a variable speed transmission the combination of a driving shaft, a driven shaft, a pair of intermittent gripping members, one revolving with a shaft, the other held against revolving, and connections between the driving shaft and said revolving member and the driven shaft adapted to cause transmission of power from shaft to shaft when the members are gripped, and a resilient element or spring associated with the non-revolving member.

16. In a variable speed transmission the combination of a driving crank, a driven shaft, a non-revolving gripper member, as a ratchet wheel, concentrically arranged, at least three gripper members as pawls adapted to revolve concentrically with the driven shaft and to coöperate with said non-revolving member, and connections from the driving crank for successively actuating said revolving members to drive the driven shaft.

17. In a variable speed transmission the combination of a variable throw driving crank, a driven shaft, a non-revolving gripper member, as a ratchet wheel, concentrically arranged, at least three gripper members as pawls adapted to revolve concentrically with the driven shaft and to coöperate with said non-revolving member, and connections from the driving crank for successively actuating said revolving members to drive the driven shaft in opposite direction to the driving crank.

18. In a variable speed transmission the combination of a driving crank, a driven shaft, a non-revolving gripper member, as a ratchet wheel, concentrically arranged, at least three gripper members as pawls adapted to revolve concentrically with the driven shaft and to coöperate with said non-revolving member and connections from the driving crank for successively actuating said revolving members to drive the driven shaft, and a resilient spring device for permitting yielding of said non-revolving gripper member, whereby the driven shaft is actuated by steady torque and with uniform speed.

19. In a variable speed transmission the combination of a variable throw driving crank, a driven shaft, a non-revolving gripper member, as a ratchet wheel, concentrically arranged, at least three gripper members as pawls adapted to revolve concentrically with the driven shaft and to coöperate with said non-revolving member, and connections from the driving crank for successively actuating said revolving members to drive the driven shaft in opposite direction to the driving crank, and a resilient spring device permitting yielding of said non-revolving gripper member, whereby the driven shaft is actuated by steady torque and with uniform speed.

20. In combination with a variable speed transmitter a control lever, as 62, adapted to be thrown at will for decreasing the speed ratio, resilient means, as 64, opposing such movement and tending to increase the speed ratio, an adjustable stop, as 67, adapted to variably determine the maximum throw of said control lever and thereby the maximum speed ratio, and means, as 70, for adjusting said stop at will.

21. In combination with a variable speed transmitter, a control lever, adapted to be thrown at will for decreasing the speed ratio, means opposing such movement and tending to increase the speed ratio, a stop device adapted to determine the maximum throw of said control lever and thereby the maximum speed ratio, and means for adjusting said stop device at will.

In testimony whereof, I have affixed my signature.

JOHN REECE.